United States Patent
Gu (12) 
(10) Patent No.: US 6,606,182 B2
(45) Date of Patent: Aug. 12, 2003

(54) TUNING AND TEMPERATURE COMPENSATION OF THE AIR-GAP ETALON FOR DENSE WAVELENGTH-DIVISION MULTIPLEXING APPLICATION

(75) Inventor: Shijie Gu, Sunnyvale, CA (US)

(73) Assignee: Oplink Communications, Inc., San Jose, CA (US)

( * ) Notice: Subject to any disclaimer, the term of this patent is extended or adjusted under 35 U.S.C. 154(b) by 0 days.

(21) Appl. No.: 09/991,266

(22) Filed: Nov. 16, 2001

(65) Prior Publication Data

US 2003/0095261 A1 May 22, 2003

(51) Int. Cl.$^7$ .............................. G02F 1/03; G02F 1/07; G02B 7/02
(52) U.S. Cl. ..................... 359/260; 359/279; 359/820
(58) Field of Search .................... 359/260, 279, 359/820, 127; 385/3, 39

(56) References Cited

U.S. PATENT DOCUMENTS 6,005,995 A  * 12/1999  Chen et al. .................. 385/24
6,169,604 B1    1/2001   Cao ........................... 356/519
6,169,626 B1    1/2001   Chen .......................... 359/279
6,215,802 B1    4/2001   Lunt .......................... 372/34
6,275,322 B1  *  8/2001   Tai ............................ 359/279
6,386,718 B1  *  5/2002   Qian .......................... 359/879
2002/0154314 A1 * 10/2002 Copner et al. ............... 356/450

FOREIGN PATENT DOCUMENTS

WO    WO01/84201 A2 * 11/2001 ............ G02B/6/34

* cited by examiner

*Primary Examiner*—Huy Mai
*Assistant Examiner*—Tuyen Tra
(74) *Attorney, Agent, or Firm*—Lumen Intellectual Property Services, Inc.

(57) ABSTRACT

An etalon includes a tuning plate in the air-gap between the etalon mirrors. The method of tuning includes selecting a tuning plate that makes the optical length of the etalon slightly less than required for ITU and then rotating the tuning plate through a small angle until tuning is complete. The tuning plate material is selected to provide dispersion compensation and to compensate for thermal expansion of the mirror spacers.

15 Claims, 6 Drawing Sheets

PRIOR ART

Fig. 1

PRIOR ART

Fig. 2

PRIOR ART

| Materials | $N(\lambda=1.530\mu)$ | $\alpha(10^{-6}/°C)$ | $\beta=\dfrac{dn}{dT}(10^{-6}/°C)$ at 25°C | $\eta=(n-1)\alpha+\beta$ $(10^{-6}/°C)$ |
|---|---|---|---|---|
| S - FPL51 | 1.4861 | 13.3 | -7.5 | -1.03 |
| S - PHM52 | 1.6 | 10.1 | -5.8 | 0.26 |

Fig. 9

TUNING AND TEMPERATURE COMPENSATION OF THE AIR-GAP ETALON FOR DENSE WAVELENGTH-DIVISION MULTIPLEXING APPLICATION

FIELD OF THE INVENTION

This invention relates to optical etalons, and particularly to etalons that are to be used in fiber optic communications and fiber optic wavelength division multiplexers and demultiplexers.

BACKGROUND OF THE INVENTION

Various types of interleaver and deinterleaver devices are used in WDM and DWDM systems for multiplexing and for demultiplexing. These devices include optical gratings, thin film optical interference filters, air-gap etalon filters, and Gires-Tournois filters.

Figure 1:
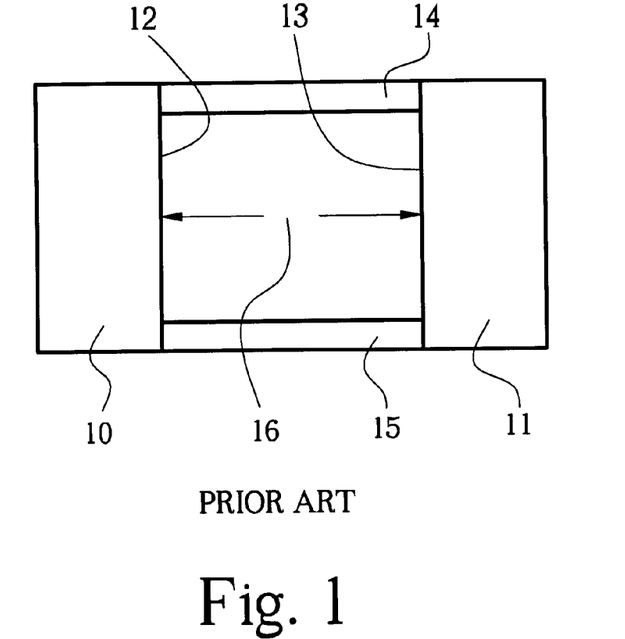
FIG. 1 shows, in a simplified form, a cross section of an air-gap etalon.

FIG. 1 shows an air-gap etalon. The air-gap etalon has two plates 10 and 11 that are spaced apart by spacers 14 and 15 so that the optically flat surfaces 12 and 13 of the two plates are parallel and face one another across an air-gap. The plates are transparent to the wavelengths of interest and the optically flat surfaces 12 and 13 are partially reflective so that light may be reflected many times between the partially reflective surfaces before exiting through one or other of the plates. If one of the reflective surfaces is 100% reflective, then the etalon is called a Gires-Tournois interferometer. The etalon has the characteristics of a comb filter in that it passes light in a plurality of evenly spaced passbands. The passbands are evenly spaced or separated by the free spectral range (FSR) of the etalon. The FSR is inversely proportional to the optical distance between the mirrors. The physical distance between the mirror surfaces is d, as indicated by the double headed arrow 16, and the optical distance is nd, where n is the refractive index of air.

A Gires-Tournois interferometer (GTI) that is to be used in WDM or DWDM must have passbands that match the standard wavelengths established by the International Telecommunications Union (ITU). At room temperature, it is required that the resonant wavelengths of the GTI match the ITU standard wavelengths to within 0.01 nm or 1 part in a million. Therefore the optical length of the GTI must also be within 1 part in a million of the ideal value. It is not feasible to make spacers to such a tolerance. Therefore, tuning is required to adjust the optical length of a GTI to bring the optical length within the tolerances stated above.

A number of methods have been used for altering the optical distance between the mirrors of an etalon to adjust or tune the pass bands. Such methods include the use of pneumatic cell, piezoelectric devices, and rotating the etalon.

Figure 2:
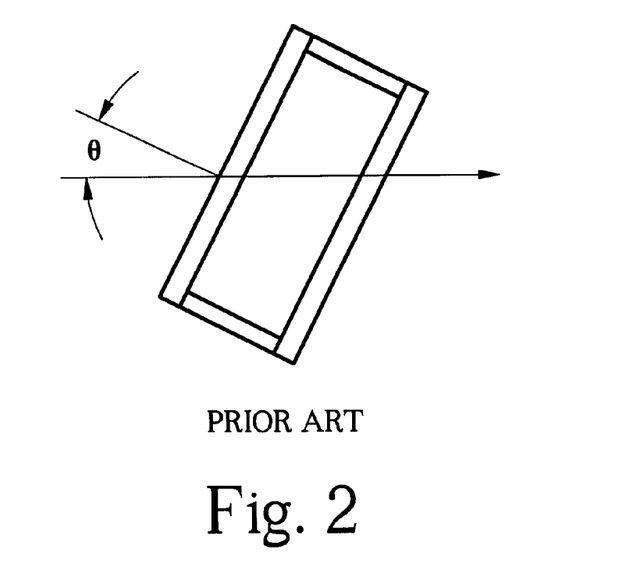
FIG. 2 illustrates a prior art method of tuning an etalon, a method in which the entire etalon is rotated through a small angle.

Pneumatic cell and piezoelectric tuning devices are unsuitable for DWDM because they are active devices and also have a problem of temperature instability FIG. 2 illustrates conventional tuning by etalon rotation. The etalon as a whole is rotated through a small angle $\theta$ relative to the incident beam, thus changing the effective optical length of the etalon. In WDM and DWDM, the etalon must be perpendicular to the incident light beam, and therefore etalon rotation is not a suitable method of tuning.

In designing an etalon or GTI for use in DWDM, special attention must also be paid to the requirements for temperature stability. The drift of the center (resonant) wavelengths must be less than 0.01 nm from 0 to 65° C. In an air spaced etalon, the thermally induced drift of center wavelength is due to thermal expansion of the spacer material, and is also due thermal effects in the air.

The density of the air is $$\rho = \frac{p}{RT},$$

where R is the gas constant and p is the pressure. If the air is allowed to expand at a fixed pressure, then $$\frac{dn}{dT} \propto -\frac{p}{RT^2}$$

negative and its magnitude is $\approx 10^{-6}$. This causes about 0.1 nm wavelength drift when the temperature changes from 0 to 70° C. This problem is avoided by putting the etalon in a sealed enclosure where the air density is essentially constant and the index of refraction remains essentially constant as temperature changes.

Thermal expansion of the spacer material remains as the main cause of thermal drift of center wavelengths. Various techniques for compensating the thermal expansion of the spacers are known. For example, placing one of the mirrors on a thermally expanding riser is known.

Figure 3:
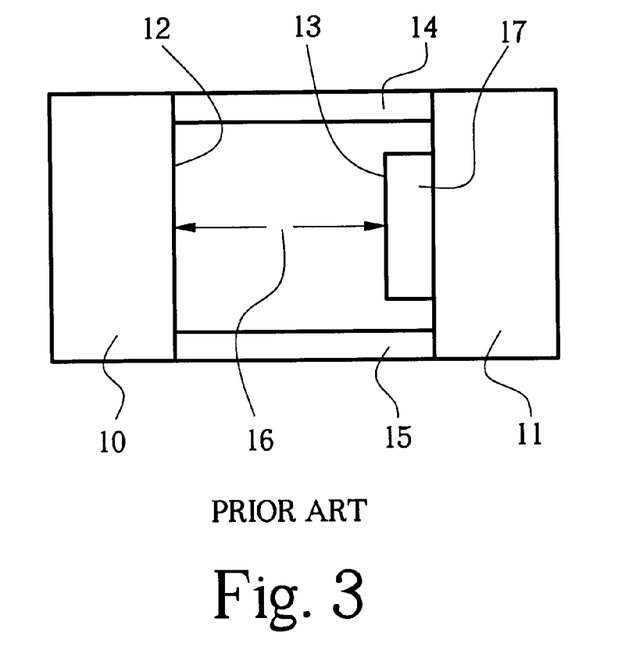
FIG. 3 shows an etalon that includes a riser for compensation of thermal expansion.

FIG. 3 shows an etalon in which one of the mirrors is located on a riser. The optically flat mirror surface 13 is here located on a riser 17. As the temperature increases the spacers 14 and 15 expand to make the optical distance between the mirrors longer, while the riser expands to make the optical distance between the mirrors shorter. With proper choice of materials for riser and spacers the expansion of the spacers can be compensated. The use of risers increases the complexity of manufacturing an etalon and does not provide for tuning.

OBJECTS AND ADVANTAGES

It is an object of the present invention to provide a method for accurately tuning an etalon to ITU standard wavelengths for fiber optical communications.

It is an object of this invention to provide an etalon tuned to ITU standard wavelengths wherein the tuning is accomplished by means of a tuning plate in the etalon.

It is an object of the present invention to provide a tuned etalon with a tuning plate, wherein the temperature stability of the etalon spectrum is enhanced by compensating spacer thermal expansion by the use of a selected optical glass in the tuning plate.

It is a further object of the present invention to provide a tuned etalon in which the tuning plate provides dispersion compensation.

SUMMARY

The objects and advantages of the present invention are obtained by an etalon in which a tuning plate provides both a course and a fine adjustment of the optical length of the etalon cavity to bring the etalon output spectrum into very close alignment with ITU standard channels.

The method of the invention includes selecting a spacer length that is slightly less than ideal, placing a first tuning plate of known thickness and refractive index in the etalon, measuring the FSR of the etalon, determining the required additional tuning plate thickness to bring the etalon exactly into tune, selecting and installing a second tuning plate of the same material that is slightly less than the ideal thickness, and then fine tuning the etalon by rotating the second tuning plate through a small angle until the etalon spectrum is the same as the ITU standard to within a required tolerance.

The etalon of the present invention is an etalon in which a tuning plate is located in the air-gap, and in which the effective thickness of the tuning plate has been adjusted by rotating the tuning plate to an angle at which the output spectrum of the etalon coincides with ITU standards to a required tolerance.

The etalon of the present invention includes a tuning plate that preferably has a small effective coefficient of thermal expansion so that the thermal expansion of etalon spacers is compensated or partially compensated over a range of temperatures.

DETAILED DESCRIPTION

Figure 4:
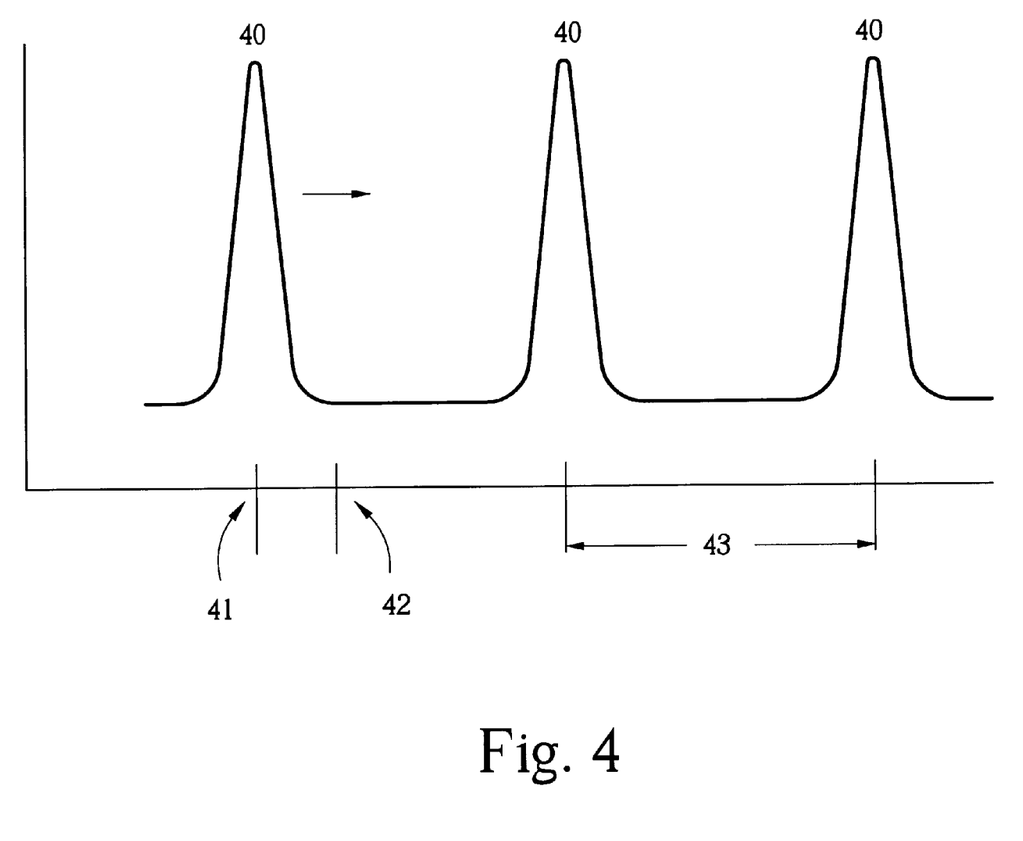
FIG. 4 shows the output spectrum of an etalon.

FIG. 4 shows the channel spectrum of an etalon. The channels 40 are at specific wavelengths or passbands. The wavelength 41 of one of the channels 40 of the etalon is shown. One of the ITU grid wavelengths 42 is also shown. It is to be noted that the ITU wavelength is offset from the etalon passbands. The separation 43 between the optical channels 40 is the free spectral range (FSR) of the etalon, and is given in Hz by $$FSR = \frac{c}{2L} \quad (1)$$

where c is the speed of light in vacuum and L is the optical length of the etalon. In an air-gap etalon the optical length L=nd, where d is the length of the spacer and n is the refractive index of air. In the following, it is assumed that n=1 for air. The $m^{th}$ order resonant (center) wavelength $\lambda_m$ and frequency $v_m$ are, respectively, $$\lambda_m = \frac{2L}{m} \quad (2)$$

and

-continued $$v_m = \frac{mc}{2L} = m \cdot FSR \quad (3)$$

where m is a positive integer.

For applications in DWDM an etalon or Gires-Tournois interferometer must meet the following requirements:
1. The $\lambda_m$ and FSR of the etalon or GTI must closely match the ITU standards.
This requires that optical length be closely controlled.
2. In addition, the etalon must meet ITU specifications over a range of temperatures. To meet this requirement, the peak wavelengths 40 must not change by more than 0.15 $\mu$m/K, where pm stands for picometer.

Figure 5:
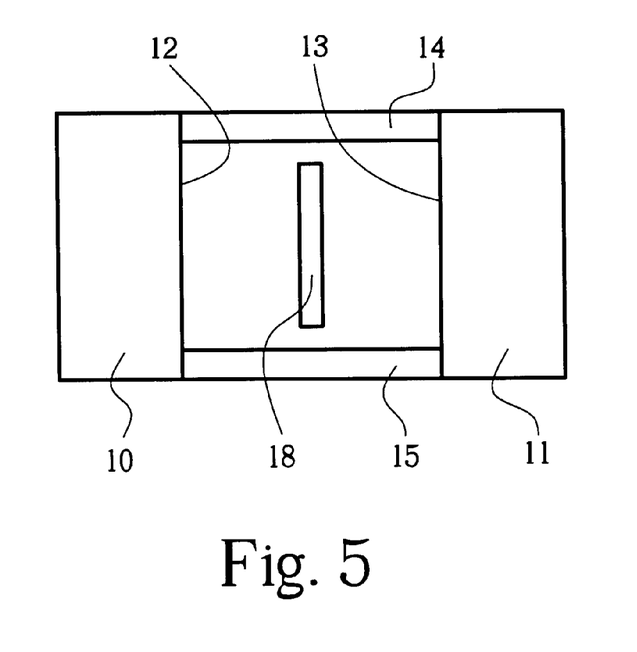
FIG. 5 shows an etalon that includes a tuning plate in accordance with the present invention.

FIG. 5 shows an etalon in accordance with the present invention. A tuning plate 18 is located within the air-gap or cavity between the reflective surface 12 and 13. The thickness h of the tuning plate is known and is generally about 100 microns. The refractive index n of the material of the tuning plate is also known. With a tuning plate of known thickness h in place in the etalon the FSR of the etalon is measured with an optical spectrum analyzer. Having measured FSR, L is then calculated from equation (1).

In addition, for the etalon of FIG. 5 with tuning plate 18 in place, L is given by $$L = d + (n-1)h \quad (4)$$

Assuming FSR (measured) differs from FSR (design), then the tuning plate needs to be changed for a thicker or thinner tuning plate. The change $\Delta h$ in thickness h that is required to shift FSR (measured) to exactly equal FSR (design) is given by $$\Delta L = (n-1)\Delta h \quad (5)$$

where $\Delta L$ is the corresponding change required in the optical length of the etalon.

If the required adjustment in FSR is $$\Delta FSR = FSR \text{ (measured)} - FSR \text{ (design)} \quad (6)$$

then $$\frac{\Delta FSR}{FSR} = -\frac{(n-1)}{L}\Delta h \quad (7)$$

where $\Delta h$ is the change in h required to bring FSR (measured) exactly to FSR (design). If $\Delta FSR>0$, then a replacement tuning plate is selected with thickness close to but less than h+|$\Delta h$|. If $\Delta FSR<0$, a replacement tuning plate is selected with thickness that is close to but less than h−|$\Delta h$|. A replacement tuning plate that has thickness exactly equal to h+|$\Delta h$| or exactly equal to h−|$\Delta h$| is generally not available. Therefore it is necessary to use a replacement tuning plate that is slightly thinner than the ideal. This completes the coarse tuning step.

After coarse tuning, $\Delta FSR$ is positive and close to zero. This means that all peaks at position 41 in FIG. 4 are close to ITU grid 42 but still need to be shifted a little toward longer wavelengths, to the right as shown in FIG. 4. This fine-tuning is accomplished by turning the tuning plate through a small angle about an axis that is perpendicular to the paper in FIG. 5. This axis is also perpendicular to the light beam entering and leaving the etalon. This axis is also parallel to the reflecting surfaces 12 and 13.

Figure 6:
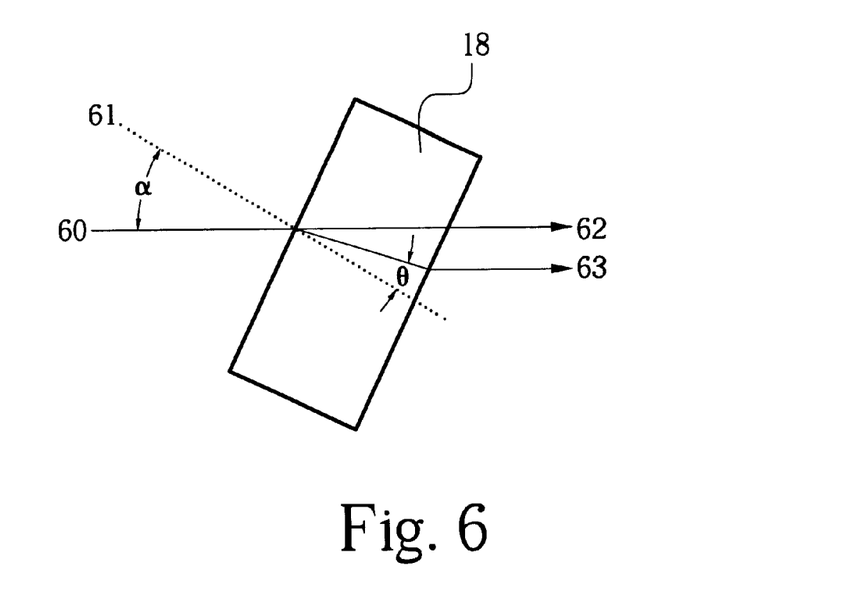
FIG. 6 illustrates optical paths with and without a tuning plate.

FIG. 6 shows a tuning plate 18 rotated by an angle $\alpha$ relative to the incident light beam 60. The normal to the tuning plate is indicated by the dotted line 61. When the angle α is zero, the input light beam 60 passes through the tuning plate and leaves the tuning plate as light beam 62. After rotating the tuning plate 18 by α degrees, the incident light beam 60 passes through the tuning plate and emerges from the tuning plate as light beam 63. The associated increase in the optical length ΔL(α) is given by $$\Delta L(\alpha) = \left[\left(\frac{1}{\cos\theta} - 1\right)n - \left(\frac{\cos(\alpha - \theta)}{\cos\theta} - 1\right)\right]h \quad (8)$$

where n and h are the refractive index and thickness, respectively, of the tuning plate, and θ is the angle of refraction in the tuning plate, where $$\theta = \sin^{-1}\left(\frac{\sin\alpha}{n}\right). \quad (9)$$

Figure 7:
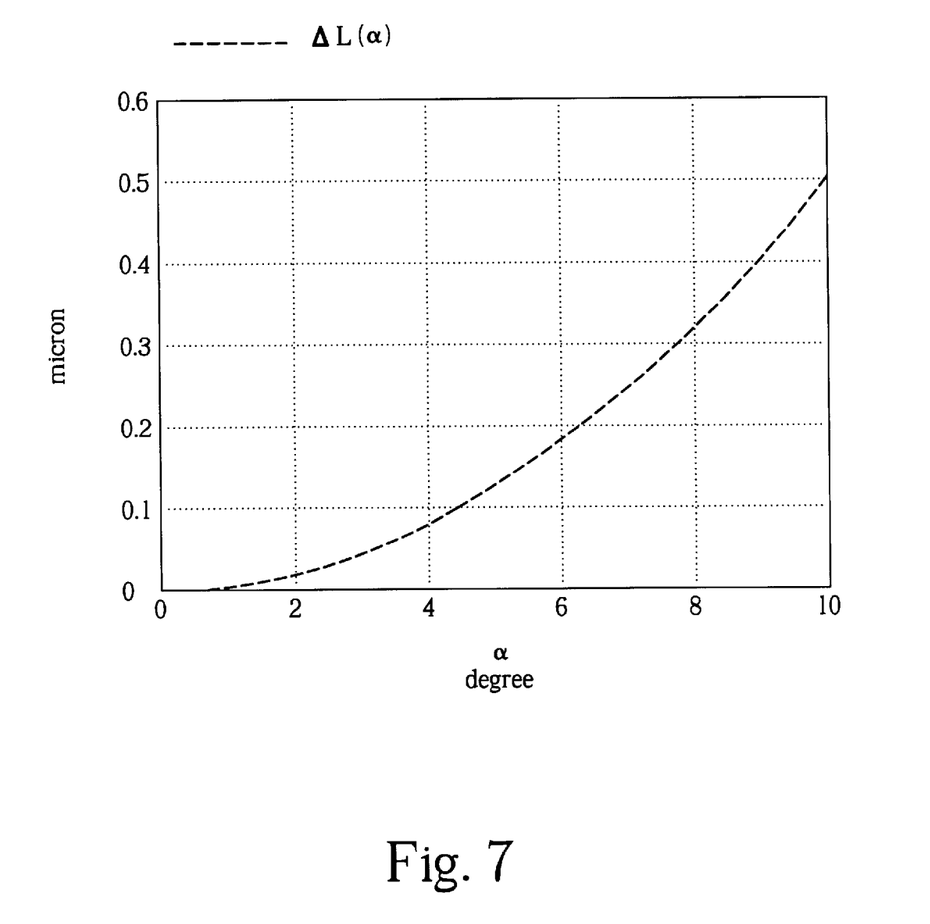
FIG. 7 is a graph of change in optical length $\Delta L$ versus tuning plate angle $\alpha$.

FIG. 7 is a graph of the optical length increase ΔL as a function of rotation angle α for a tuning plate for which the thickness h is 100 microns and the refractive index n is 1.5. As can be seen in FIG. 7, ΔL is 0.3 micron when α is 8 degrees. If the available tuning plates have thicknesses that increase in increments of 0.5 micron, then fine tuning is required to modify L by no more than (n−1)(0.5) microns. In DWDM, in order to avoid excessive polarization dependent loss, the angle a should be no more than 10 degrees. Thicker tuning plates provide higher tuning power. To minimize dispersion, the thickness of the tuning plate and the dispersion of the tuning plate material should both be small. The dispersion of the tuning plate can be compensated by tuning the etalon.

The method described above of coarse tuning by selecting a tuning plate that is within about 0.5 micron less than the ideal tuning plate thickness and then rotating the tuning plate through a small angle brings the peaks of the etalon pass spectrum into coincidence with the ITU grid with very high precision.

Moving now to the matter of temperature stability, it is important that a tuned $\alpha_\lambda = \frac{1}{\lambda}\frac{d\lambda}{dT}$ is the temperature coefficient of center wavelength λ.

$\alpha_\nu = \frac{1}{\nu}\frac{d\nu}{dT}$ is the temperature coefficient of center frequency ν.

$\alpha_L = \frac{1}{L}\frac{dL}{dT}$ is the temperature coefficient of optical length L.

$\alpha_d = \frac{1}{d}\frac{dd}{dT}$ is the thermal expansion coefficient of the spacer.

$\alpha_h = \frac{1}{h}\frac{dh}{dT}$ is the thermal expansion coefficient of the tuning plate.

$\alpha_q = \frac{1}{q}\frac{dq}{dT}$ is the thermal expansion coefficient of quartz.

$\beta_h = \frac{dn_h}{dT}$ is the temperature coefficient of the refractive index of the tuning plate.

$\beta_q = \frac{dn_q}{dT}$ is the temperature coefficient of the refractive index of quartz.

From equations (2) and (3), $$\alpha_\lambda = \alpha_L = -\alpha_\nu. \quad (10)$$

Figure 9:
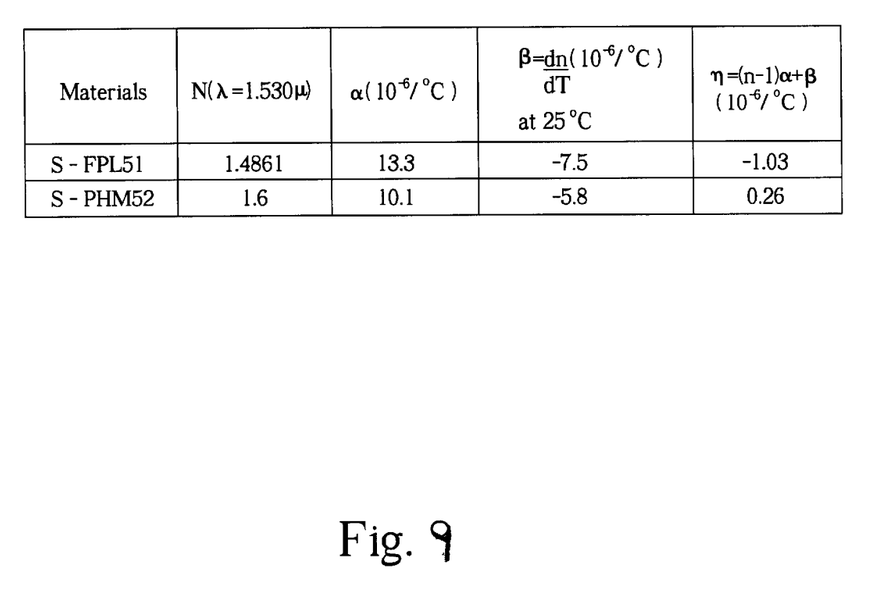
FIG. 9 is a table showing the properties of various optical glasses that are suitable for use in tuning plates in accordance with the present invention.

From the requirement that $$\left|\frac{d\lambda}{dT}\right| < 0.15 \text{ pm/K}$$

at λ of 1.5 micron, it is necessary that $|\alpha_\lambda|<10^{-7}$. Therefore, the spacer material must have $|\alpha_d|<10^{-7}$. Such a material is ZERODUR™ (Expansion class 0), a product of Schott Glass Technologies Inc., Duryea, Pa., USA. ZERODUR™ has a coefficient of thermal expansion of $-2\times10^{-8}$ and is therefore suitable for use as a spacer material in DWDM application. CLEARCERAM Z™, produced by Kabushiki Kaisha Ohara of Kanagawa, Japan, is also suitable for use as a spacer material. The coefficient of thermal expansion of CLEARCERAM Z™ is $\alpha_d=8\times10^{-8}$. Returning now to FIG. 5, $\alpha_L$ is a function of the spacer material and of the tuning plate material and is given by $$\alpha_L = \frac{1}{L}\frac{dL}{dT} = \frac{1}{L}[\alpha_d d + [(n-1)\alpha_h + \beta_h]h] \quad (11)$$

or $$\alpha_L = \frac{1}{L}\frac{dL}{dT} = \frac{1}{L}[\alpha_d d + \eta h]$$

where the effective thermal expansion coefficient of the tuning plate is η, where η is defined as η=(n−1)$\alpha_h$+$\beta_h$. From equation (11), it is clear that η is preferably small. FIG. 9 lists some physical properties of the optical glasses S-FPL51 and S-PHM52, that the present inventor has identified as particularly useful in the tuning plate. These glasses are produced by OHARA Incorporated of Japan. Any other glasses that have negative values of β are also considered suitable for the tuning plate. Two examples of improvement of the temperature stability of interleavers follow.

EXAMPLE 1

In U.S. Pat. No. 6,169,626 entitled "Optical signal interleaver" the interleaver includes a Gires-Tournois Interferometer (GTI) which is shown in FIG. 1. To tune the GTI, a tuning plate is inserted in the GTI shown in FIG. 5. For a 100 GHz/200 GHz interleaver, the FSR is 100 GHz and from equation (1) the optical length L of the GTI is 1.499 mm. Selecting S-PHM52 optical glass for the material of the tuning plate, the thickness h of the tuning plate is 100 μm. From equation (4) the thickness d of the spacers of the GTI is 1.439 mm. The material of the spacers is ZERODUR™. The thermal expansion coefficients $\alpha_d$ and $\alpha_h$ of ZERODUR™ and S-PM52 are $-2\times10^{-8}$ and $10.1\times10^{-6}$, respectively. The temperature coefficient $\beta_h$ of S-PHM52 is $\beta_h=-5.8\times10^{-6}$ between 0 and 65° C. The refractive index n of S-PHM52 is 1.6 at λ=1.545 λm. When these values of the parameters are substituted into equation (11), equation (11) gives $\alpha_L$ ($\alpha_L=\alpha_\lambda=\alpha_\nu$)

$$\Delta_L = 2.0\times10^{-9} \text{ in the temperature range } 0-65° \text{ C.} \quad (12)$$

From equation (12), when the temperature changes from 0 to 65° C., the peaks in the spectrum of the 100 GHz/200 GHz interleaver shift 0.03 GHz. Thus, the present invention provides tuning capacity and improved temperature stability.

In the above calculations the design value of the thickness d of the spacers was d=1.439 mm. A 0.1 μm error in the thickness of the spacer will make the peaks of the spectrum of that 100/200 Gz interleaver shift 13 GHz from the ITU grid. Therefore, since the error in d is typically ±1 μm, the etalon must be tuned.

In the C-band, the channels of the interleaver include channels 20–60 in the ITU grid, where $v_{20}$=192,000 GHz ($\lambda_{20}$=1561.42 nm) and $v_{60}$=196,000 GHz($\lambda_{60}$=1529.55 nm). Suppose $\Delta FSR$=0.08GHZ, where $$\Delta FSR = \frac{v_{60\,m} - v_{20\,m}}{40} - 100 \times 10^9,$$

where $v_{60m}$ and $v_{20m}$ are measured values of $v_{60}$ and $v_{20}$ respectively, then equation (7) gives $|\Delta h|$=2.1 $\mu$m. In this case $\Delta FSR$>0, so that h+$\Delta$h=100+2.1=102.1 $\mu$m. The original 100 $\mu$m tuning plate is replaced by tuning plate that has thickness h=102.0 $\mu$m. The new tuning plate is rotated until the measured value of $v_{40}$ is within ±10.5 GHz of the ITU grid value of 194,000 GHz. Then measure $v_{20}$ and $v_{60}$ again, and if both of these frequencies are within ±10.5 GHz of the ITU grid, the tuning process is complete. Otherwise, the 102 $\mu$m tuning plate can be replaced with 101.5 $\mu$m or a 102.5 $\mu$m tuning plate and the process repeated.

EXAMPLE 2

Figure 8:
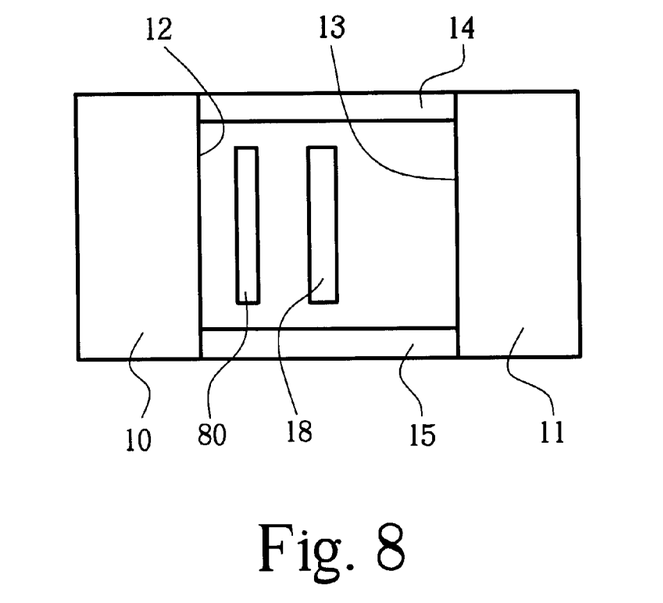
FIG. 8 shows an etalon that includes a quarter wave plate and tuning plate in accordance with the present invention.

In U.S. Pat. No. 6,169,604 entitled "Nonlinear interferometer for fiber optic dense wavelength division multiplexer utilizing a phase bias element to separate wavelength in an optical signal", the interleaver includes a GTI with a quarter-wave plate. FIG. 8 shows an etalon in accordance with the present invention. The tuning process is the same as in example 1. The etalon includes a quarter-wave plate 80 and a tuning plate 18. The quarter-wave plate is generally made of quartz, though other suitable materials may be used. The spacers are made of ZERODUR™ having a coefficient of thermal expansion equal to $-2\times10^{-8}$. The tuning plate is 50 $\mu$m thick and is made of S-FPL51 with a refractive index of n=1.486. S-FPL51 has a coefficient of thermal expansion $\alpha_h$=13.3×10$^{-6}$ and temperature coefficient of refractive index, $\beta$=−7.5×10$^{-6}$ in the temperature range 0 to 65° C. For the quartz plate 80, the average index $n_q$=1.532, $\alpha_q$=−6.0× 10$^{-6}$, $\beta_q$=13.6×10$^{-6}$ and the thickness is q=45.65 $\mu$m.

In this case equations (13) and (14) replace equations (4) and (11), respectively.

$$L = d + (n-1)h + (n_q - 1)q \tag{13}$$

$$\alpha_L = \frac{1}{L}[\alpha_d d + [(n-1)\alpha_h + \beta_h]h + [(n_q - 1)\alpha_q + \beta_q]q] \tag{14}$$

Equation (13) gives the thickness of the spacers as d=1.450 mm. Equation (14) gives $$\alpha_L = -1.6\times10^{-8} \text{ in the temperature range of 0 to 70° C.} \tag{15}$$

From equation (15), when the temperature changes from 0 to 65° C., the peaks in the spectrum of a 50/100 GHz interleaver shift 0.23 GHz.

In addition, the quartz material of the quarter-wave plate is dispersive having a refractive index that is dependent on wavelength. Due to this dispersion, the FSR of the GTI with quarter-wave plate is dependent on wavelength. This means that the channel spacing of the NLI based interleaver and deinterleaver is not constant, it is dependent on wavelength. The center frequencies of channels of the NLI based interleaver and deinterleaver cannot coincide with the ITU grid. For example, in a 50/100 GHz NLI based interleaver or deinterleaver, when the center frequency of channel 20 (f=192,000 GHz) is actually 192,000 GHz (coinciding with the ITU grid), the center frequency of channel 60 (f=196,000 GHz) is measured at 195,996 GHz, 4 GHz off from the ITU grid. Thus most of the center frequencies of channels in channels 20 to 60 (C-band) cannot coincide with the ITU grid. The tuning process of the present invention compensates the dispersion effect of the quartz quarter-wave plate so that the measured center frequencies of channels in channels 20–60 (C-band) coincide with the ITU grid to within ±0.5 GHz.

EXAMPLE 3

In this example the spacers are made of CLEARCERAM Z and the tuning plate is made of S-FPL51 glass. For a 100 GHz/22 GHz interleaver, the FSR is 100 GHz and from equation (1) the optical length L of the GTI is 1.499 mm. Selecting a tuning plate that is 85 $\mu$thick made of S-FPL51 optical glass, the length of the spacers is 1.459 mm from equation (4). The thermal expansion coefficients $\alpha_d$ and $\alpha_h$ of CLEARCERAM Z™ and S-FPL51 are 8×10$^{-8}$ and 13.3×10$^{-6}$, respectively. The temperature coefficient $\beta_h$ of S-FPL51 is $\beta_h$=−7.5×10$^{-6}$. The refractive index n of S-FPL51 is 1.4861 at $\lambda$=1.530 $\mu$m. When these values are substituted into equation (11), the result is $$\alpha_L = 2.1\times10^{-9} \text{ in the temperature range 0 to 65° C.} \tag{16}$$

Thus, when the temperature changes from 0 to 65° C., the peaks in the spectrum of the 100 GHZ/200 GHZ interleaver shift 0.03 GHz.

EXAMPLE 4

Example 4 is similar to example 2, except that CLEARCERAM Z™ is used for the spacers. In this example the tuning plate thickness is 115 $\mu$m. From equation (13) the thickness of the spacers is 1.420 mm, and from equation (14)

$$\alpha_L = 1.2\times10^{-9} \text{ in the temperature range of 0 to 65° C.} \tag{17}$$

From equation 17, when the temperature changes from 0 to 65° C., the peaks in the spectrum (C-band) of a 50 GHz/100 GHz interleaver shift by 0.015 GHz.

Thus, a GTI with quarter wave plate and a tuning plate located in the air-gap in accordance with the present invention is tunable in accordance with the present invention, and furthermore, with proper selection of tuning plate material having negative values of the effective coefficient of thermal expansion $\eta$, as defined by $\eta=(n-1)\alpha_h+\beta_h$, the thermal stability over the temperature range 0 to 65° C. is enhanced.

The use of a tuning plate in accordance with the present invention is not limited to the cases described above, and may also apply where there is some other component such as a Faraday rotator in the air-gap of the etalon or GTI.

It will be clear to one skilled in the art that the above embodiments may be altered in many ways without departing from the scope of the invention. Accordingly, the scope of the invention should be determined by the following claims and their legal equivalents.

What is claimed is:

1. A method for tuning an etalon, the etalon comprising an air-gap between two parallel mirrors, the method comprising:

measuring the free spectral range (FSR) of the etalon;
calculating the thickness of an ideal tuning plate that would bring the etalon exactly into tune;
selecting and installing a thinner tuning plate that is thinner than the ideal tuning plate in the air-gap in the etalon so that the FSR of the etalon is slightly greater than the design FSR;
rotating the tuning plate until the FSR of the etalon coincides with the design FSR to within a required precision.

2. The method of claim 1 wherein the rotating of the tuning plate is about an axis that is parallel to the mirrors.

3. The method of claim 1 wherein the step of measuring the FSR of the etalon is performed on an etalon in which a first tuning plate is installed and in which the step of calculating the thickness of an ideal tuning plate includes calculating the difference between the thickness of the first tuning plate and the ideal tuning plate.

4. The method of claim 1 wherein the step of selecting a thinner tuning plate includes selecting from a set of tuning plates wherein the thickness of plates differs by a fixed small increment so that the ideal thickness falls between two plates that differ in thickness by that fixed small increment.

5. The method of claim 4 wherein there is a maximum allowable angle of rotation of the tuning plate, and wherein there is a corresponding maximum allowable change in optical path length of the etalon that is made by rotation of the tuning plate.

6. The method of claim 5 wherein the maximum allowable angle of rotation of the tuning plate is no more than 10 degrees.

7. A tuned etalon comprising:

a spacer;

a first mirror;

a second mirror, wherein the spacer spaces the second mirror apart from and parallel to the first mirror with an air-gap between the first mirror and the second mirror; and a tuning plate located between the first mirror and the second mirror, the tuning plate being rotated about an axis that is parallel to the mirrors so as to increase the effective thickness of the tuning plate and thereby bring the etalon into tune;

wherein the tuning plate is a glass plate made of glass that has a negative temperature coefficient of refractive index.

8. The etalon of claim 9 wherein the glass is selected from the group of optical glasses that includes S-FPL51 and S-PHM52.

9. The etalon of claim 7 wherein the spacer comprises material that has a coefficient of thermal expansion $\alpha$, the absolute value of the coefficient of thermal expansion $|\alpha|$ that is less than $1 \times 10^{-7}$.

10. The etalon of claim 2 wherein the tuning plate is restricted to a maximum angle of rotation no more than 10 degrees.

11. The etalon of claim 7 wherein the tuning plate is about 100 microns thick.

12. A tuned etalon comprising:

a spacer;

a first mirror;

a second mirror, wherein the spacer spaces the second mirror apart from and parallel to the first mirror with an air-gap between the first mirror and the second mirror; and a tuning plate located between the first mirror and the second mirror, the tuning plate being rotated about an axis that is parallel to the mirrors so as to increase the effective thickness of the tuning plate and thereby bring the etalon into tune;

wherein the tuning plate is made from a material that has a negative value of the effective coefficient of thermal expansion over the temperature range of 0° to 65° C., wherein the effective coefficient of thermal expansion is defined as $(n-1)\alpha_h + \beta_h$ where n is the index of refraction, $\alpha_h$ is the thermal expansion coefficient, and $\beta_h$ is the temperature coefficient of the refractive index.

13. The etalon of claim 12 wherein the tuning plate is restricted to a maximum angle of rotation no more than 10 degrees.

14. The etalon of claim 12 wherein the tuning plate is about 100 microns thick.

15. The etalon of claim 12 wherein the spacer comprises material that has a coefficient of thermal expansion $\alpha$, the absolute value of the coefficient of thermal expansion $|\alpha|$ that is less than $1 \times 10^{-7}$.

* * * * *